(12) United States Patent  (10) Patent No.: US 8,423,426 B2
Langvin  (45) Date of Patent: *Apr. 16, 2013

(54) METHOD OF CUSTOMIZED CLEAT ARRANGEMENT

(75) Inventor: Elizabeth Langvin, Sherwood, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 13/447,423

(22) Filed: Apr. 16, 2012

(65) Prior Publication Data

US 2012/0203659 A1  Aug. 9, 2012

Related U.S. Application Data

(62) Division of application No. 12/403,891, filed on Mar. 13, 2009, now Pat. No. 8,219,461.

(51) Int. Cl.
*G06Q 30/00* (2006.01)

(52) U.S. Cl.
USPC ................ 705/26.5; 705/27.1; 36/134

(58) Field of Classification Search ........ 705/26.1–27.2; 36/113, 114, 126–129, 132, 134
See application file for complete search history.

(56) References Cited

U.S. PATENT DOCUMENTS

| | | | |
|---|---|---|---|
| 1,954,761 A | 4/1934 | Wiggin | |
| 3,672,077 A | 6/1972 | Coles | |
| 4,787,156 A | 11/1988 | Bade | |
| 6,016,615 A | 1/2000 | Day | |
| 6,598,324 B1 | 7/2003 | Tsuji | |
| 6,601,042 B1 | 7/2003 | Lyden | |
| 6,813,847 B2 | 11/2004 | Workman | |
| 7,016,867 B2 | 3/2006 | Lyden | |
| 7,107,235 B2 | 9/2006 | Lyden | |
| 2002/0036617 A1 | 3/2002 | Pryor | |
| 2003/0033207 A1 | 2/2003 | Litke et al. | |
| 2005/0198868 A1 | 9/2005 | Scholz | |
| 2005/0211470 A1 | 9/2005 | Jeffryes | |
| 2005/0278979 A1 | 12/2005 | Bramani | |
| 2007/0017125 A1 | 1/2007 | Jennings | |
| 2007/0043630 A1* | 2/2007 | Lyden | 705/26 |
| 2010/0235258 A1 | 9/2010 | Langvin | |

FOREIGN PATENT DOCUMENTS

| | | |
|---|---|---|
| EP | 0451379 | 10/1991 |
| JP | 2265502 | 10/1990 |

OTHER PUBLICATIONS

NIKEiD(TM) puts the power of design in the people's hands. (Nov. 22, 1999). PR Newswire.*
"Customized footwear is a kick, with options offered online." Sarah Mauet. McClatchy-Tribune Business News. Washington: Jan. 6, 2007. p. 1.

* cited by examiner

*Primary Examiner* — Jeffrey A Smith
*Assistant Examiner* — Resha Desai
(74) *Attorney, Agent, or Firm* — Plumsea Law Group, LLC

(57) ABSTRACT

A method for producing articles of footwear with customized cleat arrangements is disclosed. The method includes a step of designing a customized cleat arrangement using a graphical interface system; a step of drilling holes into an outer plate according to the designed customized cleat arrangement; a step of inserting receiving members into the holes; a step of attaching the outer plate to an upper; and a step of associating a plurality of cleats with the receiving members.

25 Claims, 9 Drawing Sheets

METHOD OF CUSTOMIZED CLEAT ARRANGEMENT

CROSS-REFERENCE TO RELATED APPLICATION

This application is a divisional of U.S. Pat. No. 8,219,461, currently U.S. application Ser. No. 12/403,891, entitled "Method of Customized Cleat Arrangement", filed on Mar. 13, 2009, and allowed on Mar. 16, 2012, which application is hereby incorporated by reference in its entirety.

BACKGROUND

The present invention relates generally to a method of manufacturing footwear, and in particular to a method for manufacturing an article of footwear with customized cleat placement.

Designs discussing interchangeable cleats, including adjustable cleat patterns have been previously discussed. Workman (U.S. Pat. No. 6,813,847) teaches a boot with a replaceable sole plate. The boot has a cavity located in the bottom of the sole and a sole plate that releasably fits within this cavity. Workman teaches a sole plate that can easily and quickly be replaced with other sole plates having different types of traction surfaces.

Although Workman teaches a boot with a replaceable sole plate, Workman fails to teach a system and/or method where a customer can design a customized cleat configuration. Instead, Workman only teaches a system where a customer can swap one preconfigured clear design along the bottom of a sole plate with another preconfigured design.

Tsuji (U.S. Pat. No. 6,598,324) teaches a bowling shoe having customizable ground engagement. Tsuji discloses a bowling shoe construction that has various options for removing and replacing slide parts to attach to the tread surface of a slide shoe. Tsuji teaches the use of annular cleats with a slide shoe. Although Tsuji discloses various arrangements of the annular cleats that may be used with the slide pad, the holes corresponding to the annular cleats are preconfigured, and are not customizable by the wearer or customer. Furthermore, Tsuji teaches the use of annular cleats for bowling shoes that are intended to be used on smooth wooden surfaces, not the use of cleats intended to penetrate into both natural and synthetic turf.

There is a need in the art for a customizable cleat system that solves the problems of the prior art.

SUMMARY

A method for producing articles of footwear with customized cleat arrangements is disclosed. In one aspect, the invention provides a method of customizing a cleat arrangement for an article of footwear comprising the steps of: providing a graphical interface system for designing a customized cleat arrangement; receiving a design including a customized cleat arrangement; forming holes in an outer plate corresponding to the locations of the cleats in the customized cleat arrangement; attaching the outer plate to a footwear upper and forming an assembled article of footwear; associating a set of cleats with the assembled article of footwear; and shipping the assembled article of footwear to a pre-designated shipping address.

In another aspect, the graphical interface system includes a set of graphics tools.

In another aspect, the receiving members include flanges.

In another aspect, the flanges of the receiving members are disposed against an upper side of the outer plate.

In another aspect, the step of forming holes is followed by a step of inserting receiving members into the holes of the outer plate.

In another aspect, the receiving members include hollow threaded cores configured to receive cleats.

In another aspect, the invention provides a method for ordering a customized cleat arrangement for an article of footwear, comprising the steps of: interacting with a graphical interface system; modifying an outer plate representation; selecting a graphics tool from a set of graphics tools; using the graphics tool to create a customized cleat arrangement; and submitting a finalized design including an outer plate representation with a customized cleat arrangement, and ordering the article of footwear.

In another aspect, the set of graphics tools includes a pointer tool.

In another aspect, there is a step of selecting the location of a cleat using the pointer tool.

In another aspect, there is a grid line tool.

In another aspect, there is a step of selecting a cleat size.

In another aspect, there is a large cleat size, a medium cleat size and a small cleat size.

In another aspect, the graphical interface system is available through a website.

In another aspect, the invention provides a method for producing a customized cleat representation for an article of footwear, comprising the steps of: providing a graphical interface system; providing a set of graphics tools; receiving information related to an outer plate representation including a customized cleat arrangement; and producing an article of footwear with a customized cleat arrangement based on the outer plate representation.

In another aspect, the graphical interface system is accessible via a network.

In another aspect, the network is the Internet.

In another aspect, the step of producing the article of footwear includes a step of drilling holes into an outer plate.

In another aspect, the step of producing the article of footwear includes a step of inserting receiving members into the holes of the outer plate.

In another aspect, the step of producing the article of footwear includes a step of associating a set of cleats with the receiving members of the outer plate.

In another aspect, the number of cleats comprising the set of cleats is equal to the number of receiving members.

In another aspect, the invention provides a method for producing an article of footwear with a customized cleat arrangement, comprising the steps of: receiving a customized cleat arrangement from a customer; forming holes in an outer plate corresponding to the locations of the cleats in the customized cleat arrangement; inserting receiving members into the holes of the outer plate; attaching the outer plate to a footwear upper and forming an assembled article of footwear; associating a set of cleats with the assembled article of footwear; and shipping the assembled article of footwear to a pre-designated shipping address.

In another aspect, the step of receiving the customized cleat arrangement from the customer includes a step of accessing the Internet.

In another aspect, the customized cleat arrangement is received by mail or fax.

In another aspect, the holes in the outer plate are formed by a drill.

In another aspect, the drill is automated.

In another aspect, the drill is controlled by a computer.

In another aspect, the drill is controlled manually.

In another aspect, the invention provides a method of customizing cleat arrangements for a pair of complementary articles of footwear, comprising the steps of: providing a graphical interface system for designing a customized cleat arrangement; receiving a design including a customized cleat arrangement; associating the customized cleat arrangement with a first article of footwear; including an option within the graphical interface system for duplicating the customized cleat arrangement to be associated with a second article of footwear that is complementary to the first article of footwear; and producing a pair of complementary articles of footwear with customized cleat arrangements.

In another aspect, the option is a button.

In another aspect, there is a step of selecting a pre-designed customized cleat arrangement from a group of pre-customized cleat arrangements.

In another aspect, there is a step of modifying the pre-designed customized cleat arrangement within the graphical interface system.

In another aspect, the invention provides a method of customizing cleat arrangements for a pair of complementary articles of footwear, comprising the steps of: providing a graphical interface system for designing a first customized cleat arrangement and a second customized cleat arrangement; receiving a design including a first customized cleat arrangement and a second customized cleat arrangement; associating the first customized cleat arrangement with a first article of footwear and the second customized cleat arrangement with a second article of footwear that is complementary to the first; and producing a pair of complementary articles of footwear with customized cleat arrangements.

In another aspect, the first customized cleat arrangement is distinct from the second customized cleat arrangement.

In another aspect, the first customized cleat arrangement is substantially identical to the second customized cleat arrangement.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
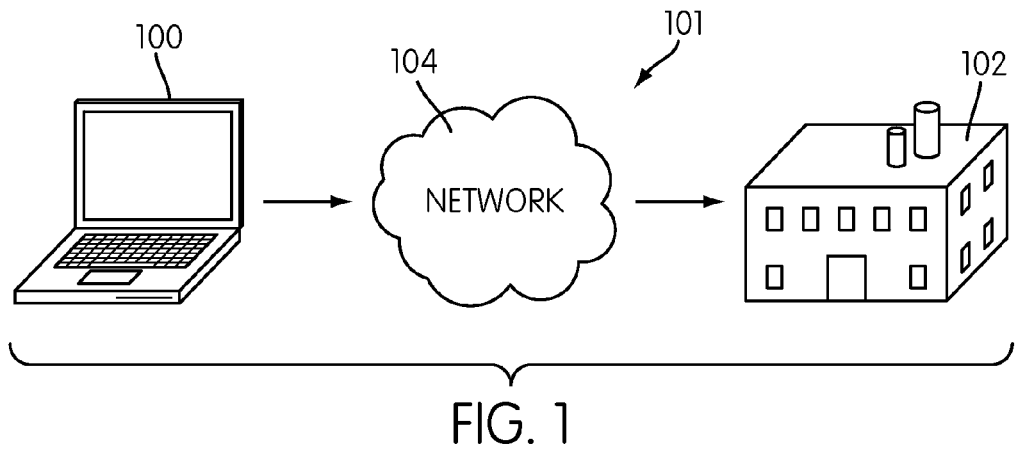
FIG. 1 is an embodiment of a cleat customization system.

FIG. 1 is a schematic diagram of an illustrative embodiment of cleat customization system 101. The term customization system, as used throughout this detailed description, refers to a system for manufacturing articles of footwear through the production of easily customizable portions of an article of footwear. In some embodiments, these portions may be customized by the manufacturer or a third party designer. In an embodiment, the portions may be customized by the party purchasing the articles of footwear.

Furthermore, it should be understood that the following cleat customization system 101 may be used to manufacture customized cleat arrangements for any type of footwear. Examples include, but are not limited to, football shoes, soccer shoes, baseball shoes, hiking boots, as well as other types of footwear. Generally, any type of footwear including cleats may be manufactured using cleat customization system 101.

In an embodiment, cleat customization system 101 comprises a remote terminal 100 connected to factory 102 by way of network 104. Generally, remote terminal 100 may be any type of computer, including either a desktop or a laptop computer. In other embodiments, remote terminal 100 may be any type of device that includes a display, a processor, and the ability to transmit and receive data from a remote network. Examples of such devices include, but are not limited to, PDA's, cell phones, as well as other types of devices.

In this embodiment, factory 102 represents a manufacturing system configured to manufacture articles of footwear. Here, factory 102 is shown as a single building for illustrative purposes only. In many cases, factory 102 will comprise many buildings. In some cases, factory 102 may comprise many buildings that are disposed in different geographic locations. Generally, the term factory, as used here, may also refer to distributors and/or suppliers. In other words, the term factory may also apply to various operations on the manufacturing side, including the operations responsible for parts, labor, and/or retail of the article of footwear, as well as other manufacturing side operations.

Network 104 may be configured to relay information between computer 100 and factory 102. Generally, network 104 may be a system allowing for the exchange of information between remote terminal 100 and factory 102. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 104 may be a packet-switched communications system. In an embodiment, network 104 may be the Internet.

Although some embodiments include provisions for transferring information between a customer and the manufacturer using the Internet, in other embodiments, information may be transferred between the customer and the manufacturer using other provisions. In some cases, for example, information may be exchanged via mail, fax, courier, as well as other forms of communication.

Cleat customization system 101 may include provisions that allow a customer to design a portion of an article of footwear that will be produced by a manufacturer. In some embodiments, cleat customization system 101 includes provisions that allow a customer to design a customized cleat arrangement for an article of footwear. In an embodiment, a customer may use cleat customization system 101 to select the arrangement of cleats, as well as the size and type of cleats used with an article of footwear.

Figure 2:
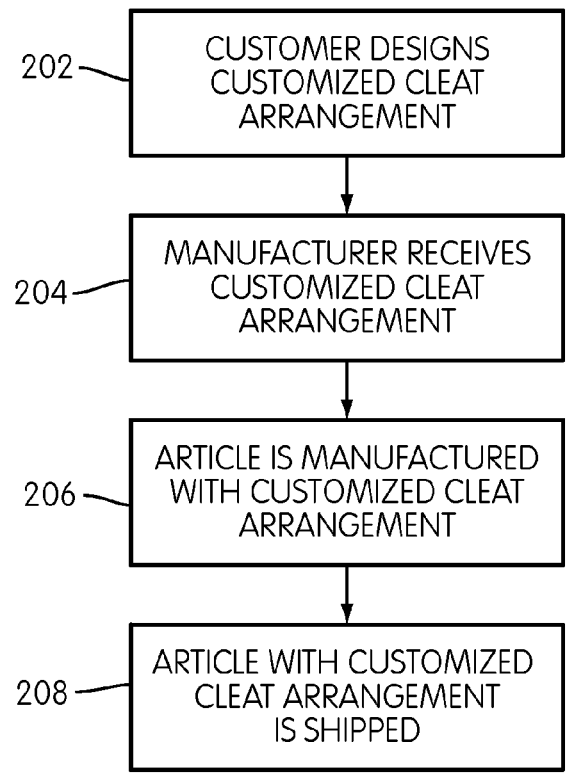
FIG. 2 is an embodiment of a process for a cleat customization system.

FIG. 2 is an embodiment of a method for designing a customized cleat arrangement using cleat customization system 101. During first step 202, a customer may interact with a website in order to design a customized cleat arrangement. In some cases, the customer may select a pre-designed customized cleat arrangement. Once the customer has finalized the arrangement, the manufacturer may receive the customer's design, as in second step 204. Following this, the article of footwear, including the customized cleat arrangement, may be manufactured according to the customer's design during third step 206. Finally, during fourth step 208, the article of footwear, including a customized cleat arrangement, may be shipped to a pre-designated address that may belong to the customer, a retail store or another party.

Figure 3:
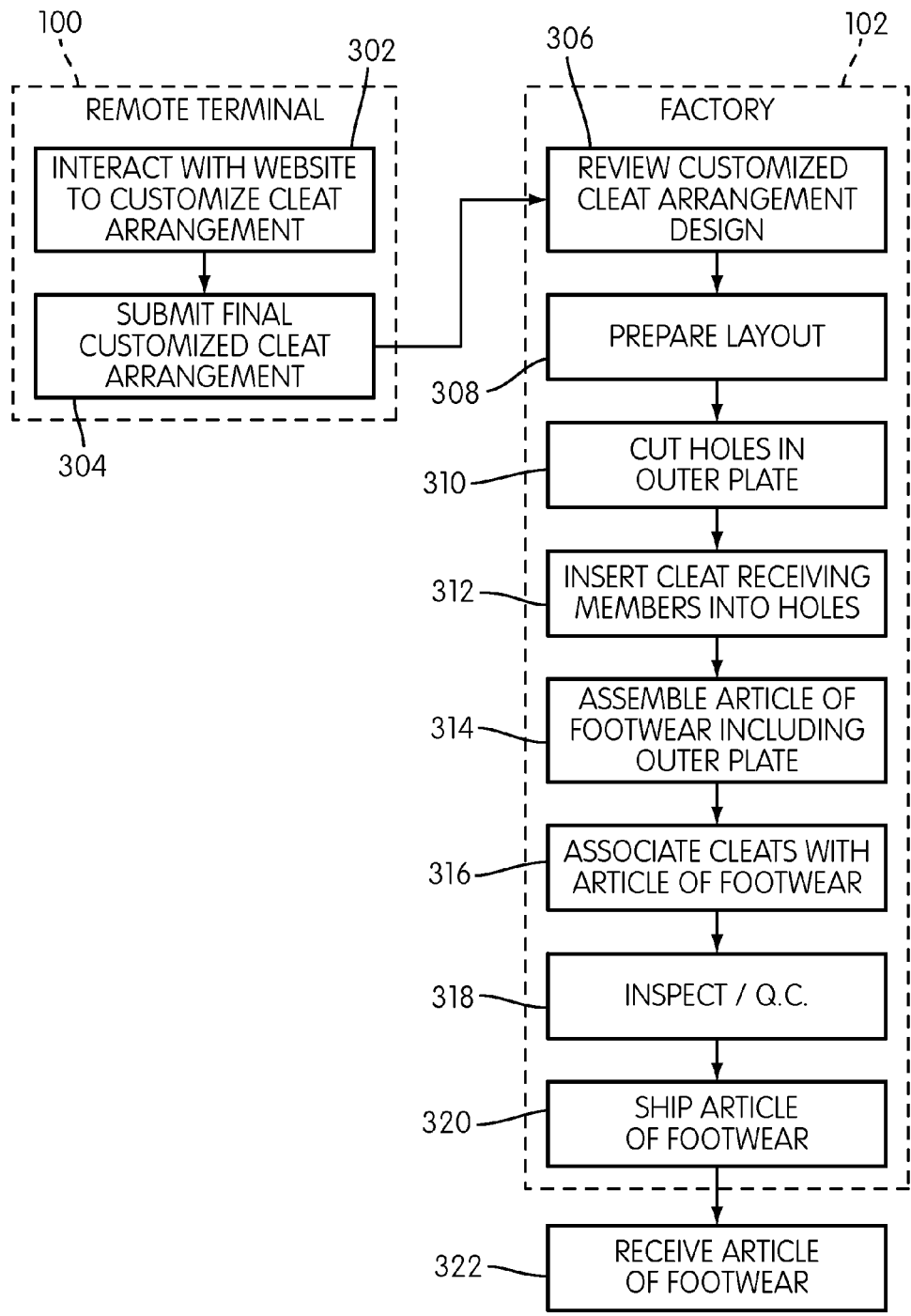
FIG. 3 is an embodiment of a detailed process for a cleat customization system.

Referring to FIG. 3, cleat customization system 101 may be best understood by separating the steps associated with remote terminal 100 and those associated with factory 102. In some embodiments, those steps associated with remote terminal 100 are performed on or by remote terminal 100 and those steps associated with factory 102 are performed on or by factory 102. However, this is not necessarily the case, and some of the steps associated with remote terminal 100 may be performed on or by factory 102 or some other resource, and some of the steps associated with factory 102 may be performed on or by remote terminal 100 or some other resource.

In first step 302, a customer may access a remote website with remote terminal 100. In some embodiments, the customer may use the website to design an article of footwear with a customized cleat arrangement during this step. Here, the term website is used in the most general sense as meaning any collection of data located on a remote server accessible with a web browser of some kind. In many cases, a website may be a collection of web pages found on the World Wide Web. In an embodiment, the term web page may refer to any HTML/XHTML document.

In some embodiments, factory 102 includes a server of some type that supports a website with a graphical interface system. This graphical interface system may be used to design an article of footwear with a customized cleat arrangement. In some embodiments, the graphical interface system may be a graphical editor of some kind. In an embodiment, the graphical interface system may provide a set of tools that allow the customer to easily design a customized cleat arrangement for an article of footwear.

In an alternative embodiment, a website supporting a graphical interface system may be hosted outside of factory 102. In other words, the website may be owned and run by a third party separate from the manufacturer of the customizable articles of footwear. Generally, the process of customizing an article of footwear may proceed as before. In this case, the finalized design information will be processed and sent to the manufacturer by the third party.

Once the customer has finished designing the article of footwear, the finalized design may be submitted to factory 102 during second step 304. In some embodiments, the submission may be transferred through the Internet. In other embodiments, the submission may occur by way of mail, fax or other forms of communication. Following this submission, factory 102 may receive and review the customized design during third step 306.

In fourth step 308, a layout may be prepared based on the customized design information received from the customer. During fifth step 310, holes associated with the locations of cleats in the customized cleat arrangement may be drilled into an outer plate. During sixth step 312, cleat receiving members may be inserted into the holes drilled into the outer plate during the previous step.

In another embodiment, sixth step 312 may be an optional step. In other words, some embodiments may not include cleat receiving members. Instead, the outer plate can be configured to receive cleats directly into the holes. In some cases, this may be accomplished using cleats that fasten directly to the holes. For example, in one embodiment, portions of the cleats may be snapped into place within the holes. In other embodiments, the cleats could be fastened directly to the holes in any other suitable manner.

Once the cleat receiving members have been inserted into the outer plate according to the customized cleat arrangement, the outer plate may be attached to a footwear upper or a midsole associated with an upper, during seventh step 314. In some embodiments, the upper and/or midsole may be pre-selected by the customer during the customization steps.

In some embodiments, a set of cleats may be associated with the article of footwear, during eighth step 316. The set of cleats may be attached to the cleat receiving members. In other embodiments, the set of cleats may be associated with, but not attached to the article of footwear. For example, in some cases, a bag of cleats could be associated with the article of footwear. It should be understood that step 316 is an optional step, since in some cases the article of footwear may not include cleats, and instead the customer may purchase one or more sets of cleats separately from the article of footwear.

Following this, the finished article of footwear may be inspected during ninth step 318. During the last two steps, tenth step 320 and eleventh step 322, the article of footwear may be shipped from factory 102 to a pre-designated shipping address.

The following description discusses the details of the steps outlined and briefly described with reference to FIG. 3. In some embodiments, a customer has access to a remote terminal. Using the remote terminal, the customer may gain access to a website supplied by the manufacturer or a third party. In some embodiments, the website may include a graphical interface system, as discussed briefly in first step 302.

Although the current embodiment discloses the concept of submitting a customized cleat arrangement to a factory from a remote location, in other embodiments each step in the process of using a cleat customization system may performed at a single location, or at different locations. In one embodiment, for example, a cleat customization system could be associated with a retail store. In particular, upon arriving at a retail store, a clerk or employee of the retail store may help the customer to determine a customized cleat arrangement. In some cases, the clerk may help the customer select a customized cleat arrangement using a website. In other cases, the clerk may use other provisions for helping the customer to select a customized cleat arrangement. At this point, one or more employees of the retail store can perform the steps of making the article with a customized cleat arrangement using one or more machines that may be located at the retail location. With this arrangement, a customer can leave the store with a pair of footwear including a customized cleat arrangement without having to wait for the footwear to ship. In other embodiments, the steps of making the article with customized cleat placement may be performed at a location different than a retail store or a factory. For example, these steps may be performed at an intermediate facility, like a distributor, or at a different facility, like a customization facility.

Referring to FIGS. 4-10, graphical interface system 400 may be used to design a customized cleat arrangement. Upon accessing graphical interface system 400, a user may be initially prompted to select a size for an article of footwear. In the current embodiment, seen in FIG. 4, four footwear sizes are shown, including first footwear size 401, second footwear size 402, third footwear size 403 and fourth footwear size 404. Each of these footwear sizes 401-404 may be associated with a particular shoe size. For example, first footwear size could be a size 7, second footwear size 402 could be a size 8, third footwear size 403 could be a size 9 and fourth footwear size 404 could be a size 10, each of these sizes referring to men's sizes. Only four footwear sizes are shown here for the purposes of illustration; however in other embodiments any number of footwear sizes could be shown. Additionally, graphical interface system 400 may not include visual diagrams for each footwear size, but may instead include a drop-down list for selecting the desired footwear size. In some cases, a customer may be allowed to select a first size for the left foot and a second (possibly different) size for the right foot.

Figure 4:
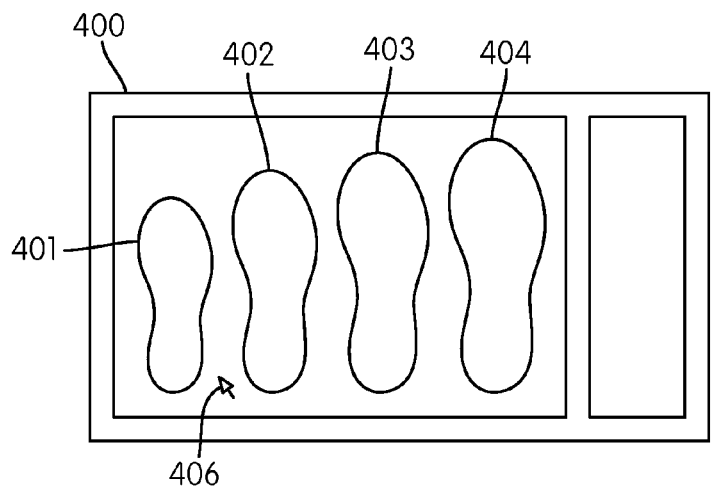
FIG. 4 is an embodiment of a graphical interface system displaying multiple sized outer plates.
Figure 5:
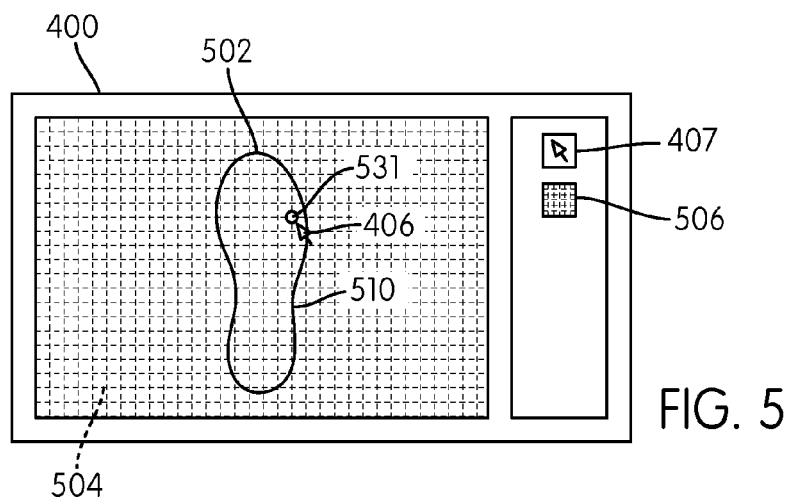
FIG. 5 is an embodiment of a graphical interface system displaying an outer plate representation.

In some embodiments, graphical interface system 400 may include pointer 406, used for making selections using graphical interface system 400. For example, using pointer 406, a user could select second footwear size 402, as shown in FIG. 4.

Once the footwear size has been selected, graphical interface system 400 may display outer plate representation 502. The outer plate of the current footwear design is the bottom most layer of the midsole/outsole structure of the article of footwear that will receive cleats. The details associated with this outer plate will be discussed later in this detailed description. The term outer plate representation 502, as used throughout this specification and in the claims, refers to a two-dimensional embodiment of an outer plate within graphical interface system 400. Specifically, the term outer plate representation in the discussion of these embodiments includes the structural design of the represented outer plate. Additionally, the term outer plate representation in the discussion of these embodiments also includes any other design attributes including, but not limited to, patterns, shapes, designs, colors, images, and any other graphical feature of the outer surface of the represented outer plate.

For the purposes of illustration, outer plate representation 502 is depicted here in the form of a clear plastic outer plate. However, in other embodiments, outer plate representation 502 may include various graphical designs and colors. In some embodiments, outer plate representation 502 may have a different shape, including various additional structural features.

In some embodiments, graphical interface system 400 includes provisions for designing a customized cleat arrangement. In some embodiments, a user may manually select the location of one or more cleats on outer plate representation 502 using pointer 406 once pointer tool 407 has been selected. In this embodiment, first cleat 531 is disposed at lateral side 510 of outer plate representation 502.

Graphical interface system 400 may also include grid lines 504 that may be turned on and off using grid line tool 506. Using grid lines 504 may allow for a user to accurately arrange the positions for each cleat on outer plate representation. In some embodiments, the density of grid lines 504 may be modified. Additionally, in some embodiments only horizontal grid lines may be used, and in other embodiments only vertical grid lines may be used.

Figure 6:
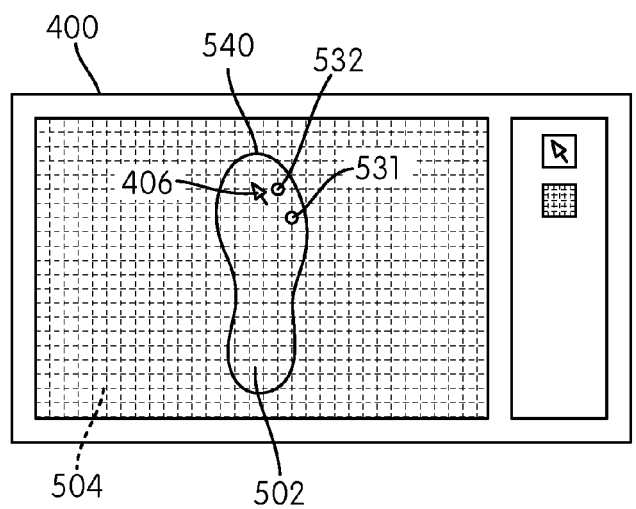
FIG. 6 is an embodiment of a graphical interface system displaying an outer plate representation.

FIG. 6 is an embodiment of outer plate representation 502 including first cleat 531 and second cleat 532. In this embodiment, second cleat 532 has been positioned at forward portion 540 of outer plate representation 502. As with first cleat 531, second cleat 532 may be positioned using pointer 406. In some embodiments, grid lines 504 may be used to determine the preferred spacing between first cleat 531 and second cleat 532.

Figure 7:
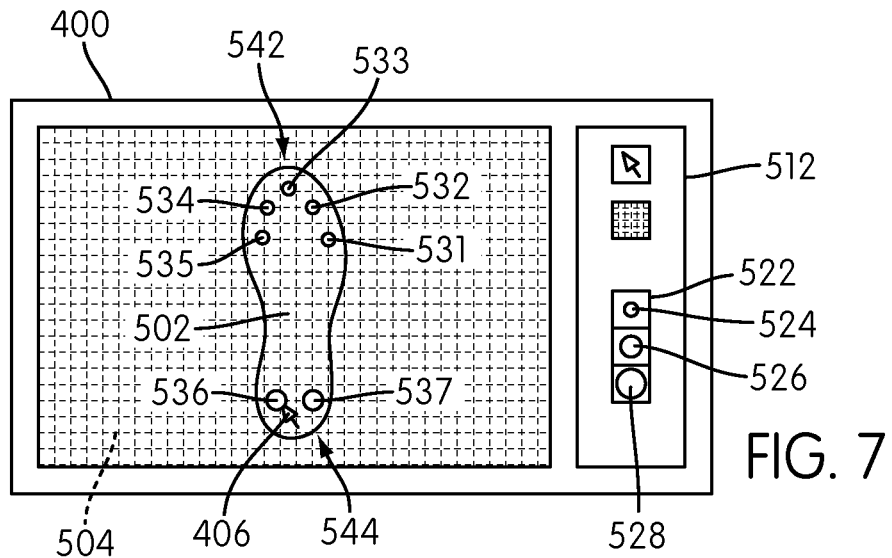
FIG. 7 is an embodiment of a graphical interface system displaying an outer plate representation.

FIG. 7 is an embodiment of a finished customized cleat arrangement associated with outer plate representation 502. In this embodiment, first cleat 531, second cleat 532, third cleat 533, fourth cleat 534 and fifth cleat 535 may be disposed on forefoot portion 542 of outer plate representation 502. Additionally, sixth cleat 536 and seventh cleat 537 are disposed on heel portion 544 of outer plate representation 502.

In addition to the location of each cleat, a user may select a size for each cleat. In some embodiments, graphics toolbar 520 includes a set of cleat sizes 522, including small cleat size 524, medium cleat size 526 and large cleat size 528. This arrangement allows a user to choose the size and location of each cleat.

In the current embodiment, cleats 531-535 may be associated with medium cleat size 526. Sixth cleat 536 and seventh cleat 537 may be associated with large cleat size 528. This configuration may allow a user's heel to penetrate firmly into the ground during circumstances where their feet are flat on the ground, but limit the degree of penetration of the forefoot into the ground during motions such as running, where only a portion of the heel is contacting the ground.

Although outer plate representation 502 is shown within graphical interface system 400 as a top down view, in other embodiments, the orientation or view of outer plate representation 502 may be changed. In some embodiments, this may include a provision for moving outer plate representation 502 to various regions of graphical interface system 400. In other embodiments, this may include a provision for rotating outer plate representation 502 about a set of axes. Modifying the view of outer plate representation 502 may better facilitate the user in designing a customized cleat arrangement.

In another embodiment, a customized cleat arrangement can be determined by measuring one or more characteristics of a foot of a customer. For example, in one embodiment, a clerk at a retail store may use pressure mapping technology to determine customized pressure information about the foot of the customer. The clerk may then record that information and use the information to generate a customized cleat arrangement for the customer.

Often, the type of cleat arrangement needed by a user may be chosen according to various factors such as the type of sport that the article of footwear may be used with, as well as the position the user or athlete may play. In some cases, graphical interface system 400 may include a group of pre-designed customized cleat arrangements associated with various sports and/or positions. In some embodiments, a user could select one of these pre-designed arrangements and, in some cases, make modifications to them using the previously discussed tools associated with graphical interface system 400.

Figure 8:
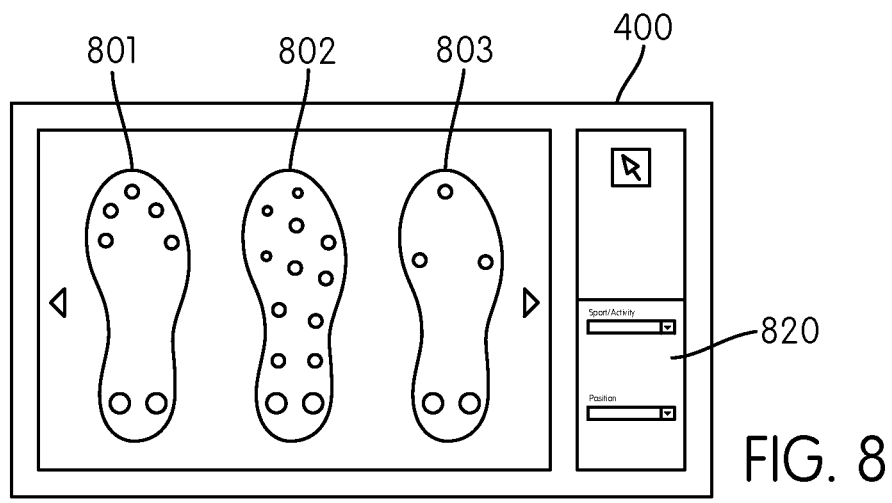
FIG. 8 is an embodiment of a graphical interface system displaying a group of pre-designed customized cleat arrangements.

FIG. 8 is an embodiment of a group of pre-designed customized cleat arrangements, including first pre-designed arrangement 801, second pre-designed arrangement 802 and third pre-designed arrangement 803. Each of these arrangements 801-803 may be configured to achieve a particular type of traction for the user or athlete. First pre-designed cleat arrangement 801, including moderately spaced cleats, may be used by athletes requiring a medium degree of traction. Pre-designed cleat arrangement 801 may be used by an athlete playing football, for example, in dry field conditions. Second pre-designed cleat arrangement 802, including densely spaced cleats, may be used by an athlete requiring a large degree of traction, such as a soccer player. Finally, third pre-designed cleat arrangement 803, which is a sparse arrangement of cleats, may be used by an athlete requiring only minimal traction or penetration into the ground. Third pre-designed cleat arrangement 803 may be used by a golfer.

Figure 9:
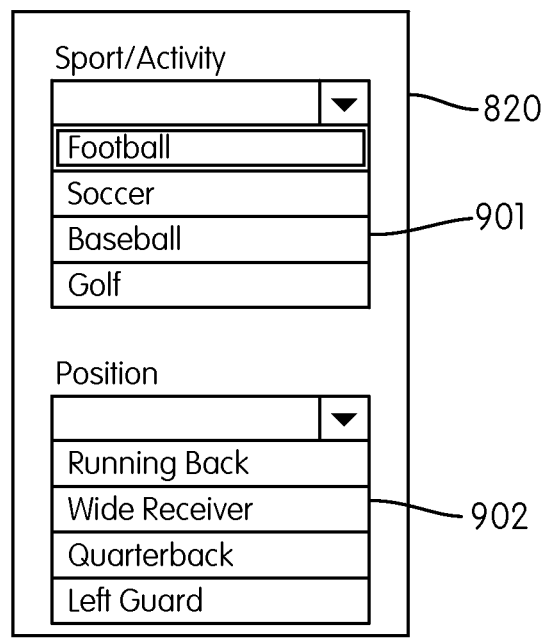
FIG. 9 is an embodiment of a menu for a graphical interface system.

In some embodiments, graphical interface system 400 may include provisions that allow a user to search for specific types of cleat arrangements according to various pre-determined criteria. In an embodiment, graphical interface system 400 may include drop down menus 820, as seen in FIG. 9. Using drop down menus 820, a user may search for a particular type of cleat arrangement by selecting a sport from first drop down menu 901 as well as a position from second drop down menu 902. The user may then select the desired cleat arrangement and modify it according to their needs using graphical interface system 400.

In another embodiment, different pre-designed customized cleat arrangements can be associated with different types of medical conditions. For example, a customer with sensitive pressure regions on a particular part of the foot can select a pre-designated customized cleat arrangement that is configured to help avoid applying pressure directly to those pressure regions. In some cases, a user can search for various types of medical conditions using a drop down menu as described above. Examples of medical conditions associated with the foot include, but are not limited to, sesamoiditis, heel spurs, heel fissures, arch pain, as well as other medical conditions associated with the foot. The customization system may then generate a pre-designated customized cleat arrangement according to the selected medical condition. For example, for a customer with sesamoiditis, which is associated with pain at the ball of the foot, a pre-designated customized cleat arrangement may be generated that has few or no cleats disposed near the ball of the foot. At this point, a user may choose to use this pre-designated customized cleat arrangement or the customer may choose to modify the arrangement using the graphical interface system.

Additionally, throughout this specification, it should be understood that not only a single article of footwear, but a pair of footwear may be designed using cleat customization system 101. Any designs, tools, or other mechanisms applied to the design of one article of footwear may likewise be applied to a second, complementary, article of footwear. The term complementary, as used throughout this specification and in the claims, refers to the association of a left outer plate associated with a left article of footwear with a right outer plate associated with a right article of footwear and vice-versa.

Figure 10:
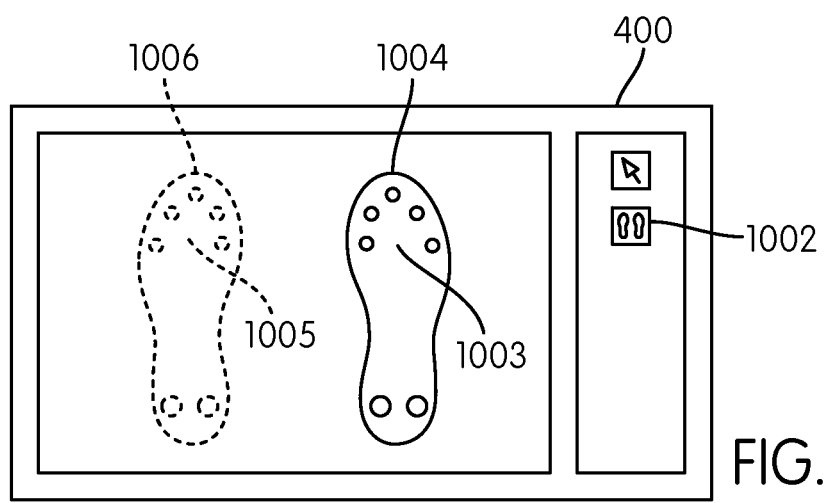
FIG. 10 is an embodiment of a graphical interface system displaying complementary outer plate representations.

Referring to FIG. 10, graphical interface system 400 may include provisions for automatically applying a mirror image of the customized cleat arrangement to a complementary outer plate. Graphical interface system 400 may include duplication tool 1002. In this embodiment, a user may select duplication tool 1002 once they have finished first customized cleat arrangement 1003 for first outer plate 1004. Graphical interface system 400 then may create second customized cleat arrangement 1005 for second outer plate 1006. Second customized cleat arrangement 1005 may be a mirror image of first customized cleat arrangement 1003. Using duplication tool 1002, a user may be saved the time and effort of designing a second customized cleat arrangement.

In some embodiments, a distinct customized cleat arrangement could be applied to first outer plate 1004 and second outer plate 1006. In other words, the complementary outer plates 1004 and 1006 need not include identical cleat arrangements. This configuration may be useful for a kicker in football who desires a greater number of cleats on the foot that is planted during a kick in order to provide a greater amount of traction, but shorter cleats on the kicking foot.

In other embodiments, a customer may design a customized cleat arrangement without the use of graphical interface system 400. In some embodiments, for example, a customer could use a form supplied by the manufacturer to design a customized cleat arrangement associated with an article of footwear. This form could then be mailed, faxed or otherwise sent to the manufacturer at factory 102. In some cases, the customer could travel to a retailer and use a form or other provision provided by the retailer to design a customized cleat arrangement. The retailer could then communicate this customized design using mail, fax, or the Internet, to the manufacturer at factory 102.

FIGS. 11-18 are intended to illustrate the steps of applying a customized cleat arrangement to an article of footwear according to a user's design. For clarity, the following detailed description discusses steps for applying a customer created customized cleat arrangement to an article of footwear, however it should be understood that the customized design may include designs created by the manufacturer, a third party designer, or anyone else.

Once a customized cleat arrangement has been received at factory 102, a properly sized outer plate 1102 may be selected according to the customer's preference. In one embodiment, outer plate 1102 may have the shape of the bottom of an article of footwear. In some embodiments, outer plate 1102 is made of a clear plastic or similar material that is durable.

Figure 11:
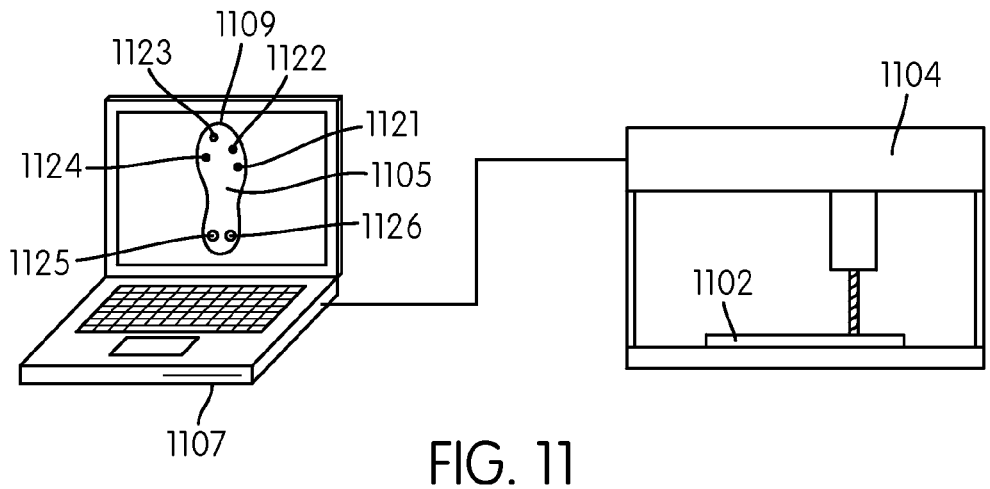
FIG. 11 is an embodiment of a step of cutting holes into an outer plate according to a customized cleat arrangement.
Figure 12:
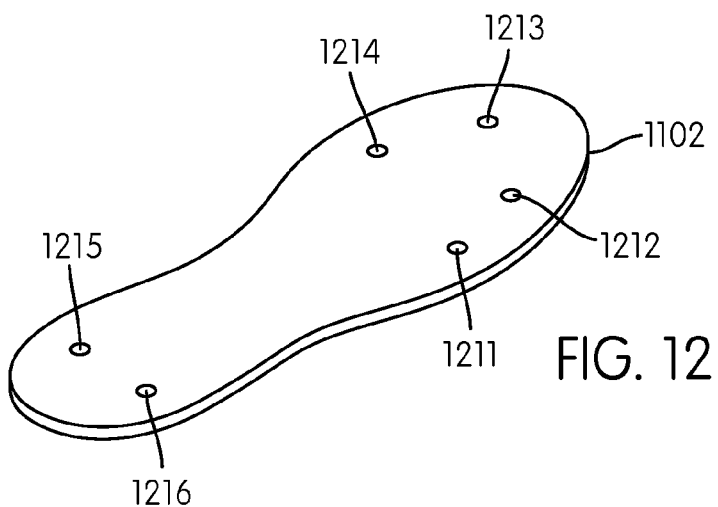
FIG. 12 is an embodiment of an outer plate with holes.

Referring to FIGS. 11-12, during a first step, drill 1104 may be used to make holes in outer plate 1102. The holes may be disposed on outer plate 1102 according to customized cleat arrangement 1105 received from a customer. Customized cleat arrangement 1105 is shown here on computer 1107. Customized cleat arrangement 1105 may include first cleat 1121, second cleat 1122, third cleat 1123, fourth cleat 1124, fifth cleat 1125 and sixth cleat 1126. In this embodiment, cleats 1121-1124 may be medium sized cleats, while cleats 1125-1126 may be large sized cleats. In some embodiments, the location and number of holes associated with outer plate 1102 is identical to the location and number of cleats comprising customized cleat arrangement 1105. In particular, once all the holes have been drilled into outer plate 1102, the arrangement of first hole 1211, second hole 1212, third hole 1213, fourth hole 1214, fifth hole 1215 and sixth hole 1216 on outer plate 1102 may be substantially identical to the arrangement of first cleat 1121, second cleat 1122, third cleat 1123, fourth cleat 1124, fifth cleat 1125 and sixth cleat 1126 on outer plate representation 1109.

In an embodiment, drill 1104 is an automated drill and therefore drill 1104 may be controlled by computer 1107 with information about customized cleat arrangement 1105. In other embodiments, however, drill 1104 may be a manual drill. For example, in some embodiments, a printed copy of outer plate representation 1109 could be placed over an outer plate and the holes could be manually drilled into place by drilling through the center of cleats 1121-1126 of outer plate representation 1109.

Figure 13:
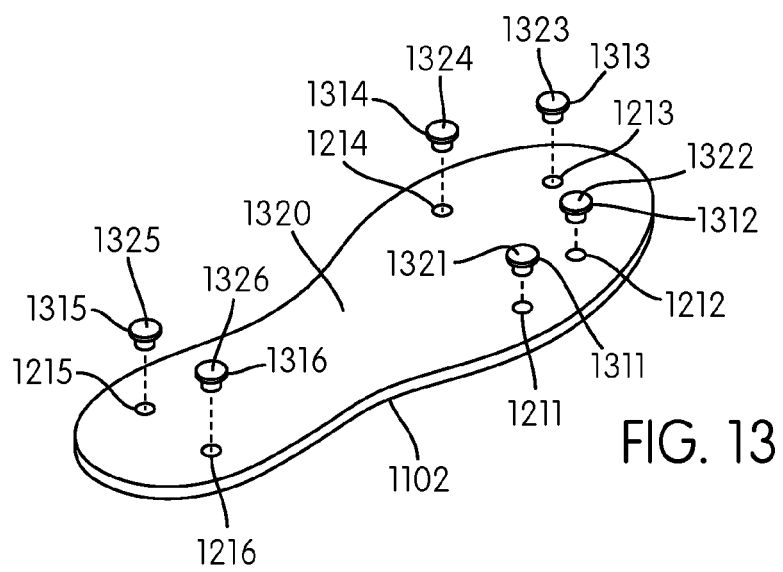
FIG. 13 is an embodiment of an outer plate with holes associated with a set of receiving members.

During a second step, shown in FIG. 13, one or more receiving members may be associated with, and inserted into, holes 1211-1216. In the current embodiment, first receiving member 1311, second receiving member 1312, third receiving member 1313, fourth receiving member 1314, fifth receiving member 1315 and sixth receiving member 1316 may be associated with, and inserted into, first hole 1211, second hole 1212, third hole 1213, fourth hole 1214, fifth hole 1215 and sixth hole 1216, respectively.

In some embodiments, receiving members 1311-1316 each include flanges configured to contact upper side 1320 of outer plate 1102. First receiving member 1311 may include first flange 1321, second receiving member 1312 may include second flange 1322, third receiving member 1313 may include third flange 1323, fourth receiving member 1314 may include fourth flange 1324, fifth receiving member 1315 may include fifth flange 1325 and sixth receiving member 1316 may include sixth flange 1326, respectively.

Figure 14:
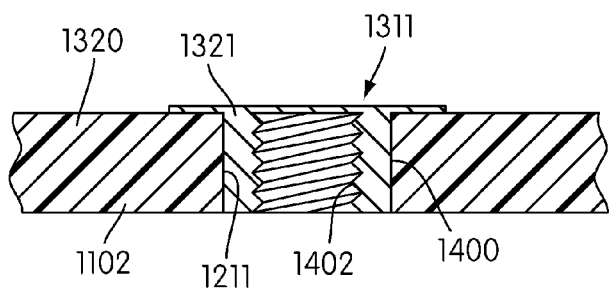
FIG. 14 is a close up cross sectional view of an embodiment of a receiving member inserted into an outer plate.

FIG. 14 is a close up cross sectional view of an embodiment of a portion of outer plate 1102 following the insertion of first receiving member 1311 into first hole 1211 of outer plate 1102. In this embodiment, first flange 1321 is disposed against upper side 1320 of outer plate 1102. First receiving member 1311 may be fixed into place within first hole 1211 using an adhesive of some kind. In other embodiments, first receiving member 1311 may be fixed into place within first hole 1211 using frictional forces between first receiving member 1311 and outer wall 1400 of first hole 1211. In a similar manner, each of the remaining receiving members 1312-1316 may be inserted into holes 1212-1216.

In different embodiments, the thickness of first flange 1311 may vary. In one exemplary embodiment, first flange 1311 may be thin enough to be substantially flush with upper side 1320 of outer plate 1102. In a similar manner, the flanges of receiving members 1312-1316 may be substantially flush with outer plate 1102. In other cases, however, first flange 1311 may be thicker and may not be flush with outer plate 1102. Likewise, in other cases, the flanges of receiving members 1312-1316 may not be flush with outer plate 1102.

Additionally, receiving members 1311-1316 may include provisions for receiving cleats. First receiving member 1311 may include hollow threaded core 1402 configured to receive a threaded cleat. Likewise, each of the remaining receiving members 1312-1316 may include similar hollow threaded cores configured to receive threaded cleats. Using this exemplary configuration, cleats may be screwed into receiving members 1311-1316 and removed from receiving members 1311-1316 easily, allowing for customers or users to change worn out cleats without much effort.

Figure 15:
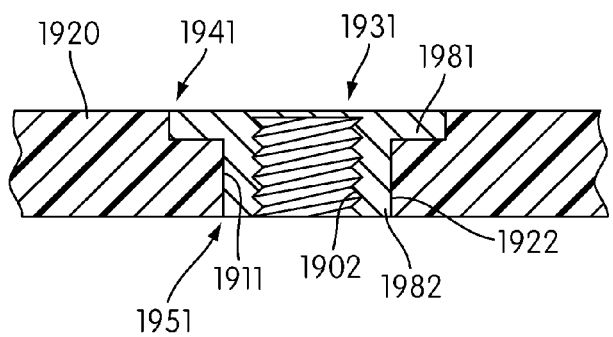
FIG. 15 is a close up cross sectional view of another embodiment of a receiving member inserted into an outer plate.

In some embodiments, provisions can be included to strengthen the attachment of a cleat receiving member into a hole of an outer plate while maintaining a substantially flush arrangement. FIG. 15 illustrates another embodiment for a receiving member and corresponding hole of an outer plate. It will be understood that while a single receiving member and a single hole are shown in this embodiment, the principles discussed here can be applied to any hole and receiving member of a customized cleat system.

In some cases, a receiving member and a corresponding hole for receiving the receiving member can be configured as a recessed joint. Referring to FIG. 15, receiving member 1931 may be inserted into hole 1911 of outer plate 1920. As previously discussed, receiving member 1931 may include hollow threaded core 1902 for receiving a threaded cleat. In some embodiments, first hole 1911 may have a shape to receive the entirety of receiving member 1931. In particular, first hole 1911 may include first narrow portion 1951 to receive extended portion 1982 of receiving member 1931. Likewise, first hole 1911 may include wide portion 1941 that is configured to receive flange portion 1981 of receiving member 1931. In some cases, the depth of wide portion 1941 may be substantially equal to the depth of flange portion 1981 in order to provide a substantially flush upper surface for outer plate 1920.

In different embodiments, hole 1911 can be created in various manners. In some cases, a drill bit shaped for creating holes of varying width can be used. In other cases, a drill bit of a first size can be used to drill the narrow portion of hole 1911, while a drill bit of a second size can be used to drill the wider portion of hole 1911. It will be understood that these changes to the hole sizes from an embodiment with a constant width hole can be accommodated in a system for automatically drilling holes in an outer plate.

As previously discussed, receiving member 1931 may be fastened into place in various manners. In some cases, receiving member 1931 may be fixed into place within hole 1911 using an adhesive of some kind. In other embodiments, receiving member 1931 may be fixed into place within hole 1911 using frictional forces between receiving member 1931 and outer wall 1922 of hole 1911. With this arrangement, the holes of an outer plate can be configured with holes that receive the flanges of the corresponding receiving members in order to maintain a substantially flush arrangement for the outer plate.

Figure 16:
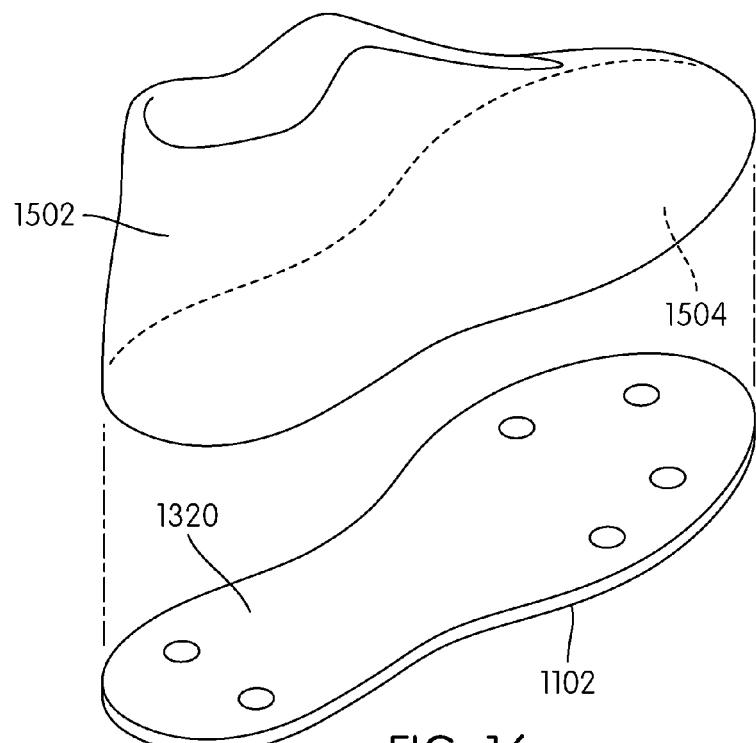
FIG. 16 is an embodiment of an outer plate attaching to an upper.

During a third step, shown in FIG. 16, after receiving members 1311-1316 have been inserted into outer plate 1102, outer plate 1102 may be assembled with upper 1502. Upper 1502 may be any type of upper associated with footwear including footwear with cleats. In some embodiments, upper 1502 may include a midsole and/or an insole. In some embodiments, upper side 1320 of outer plate 1102 may be associated with and attached to lower side 1504 of upper 1502. Outer plate 1102 may be attached to upper 1502 using an adhesive, stitching or another method of attachment.

In some embodiments, additional components can be associated with upper 1502 and outer plate 1102. For example, in one embodiment, a sockliner can be inserted into upper 1502 after outer plate 1102 has been joined with upper 1502. However, other embodiments may not include a sockliner.

Figure 17:
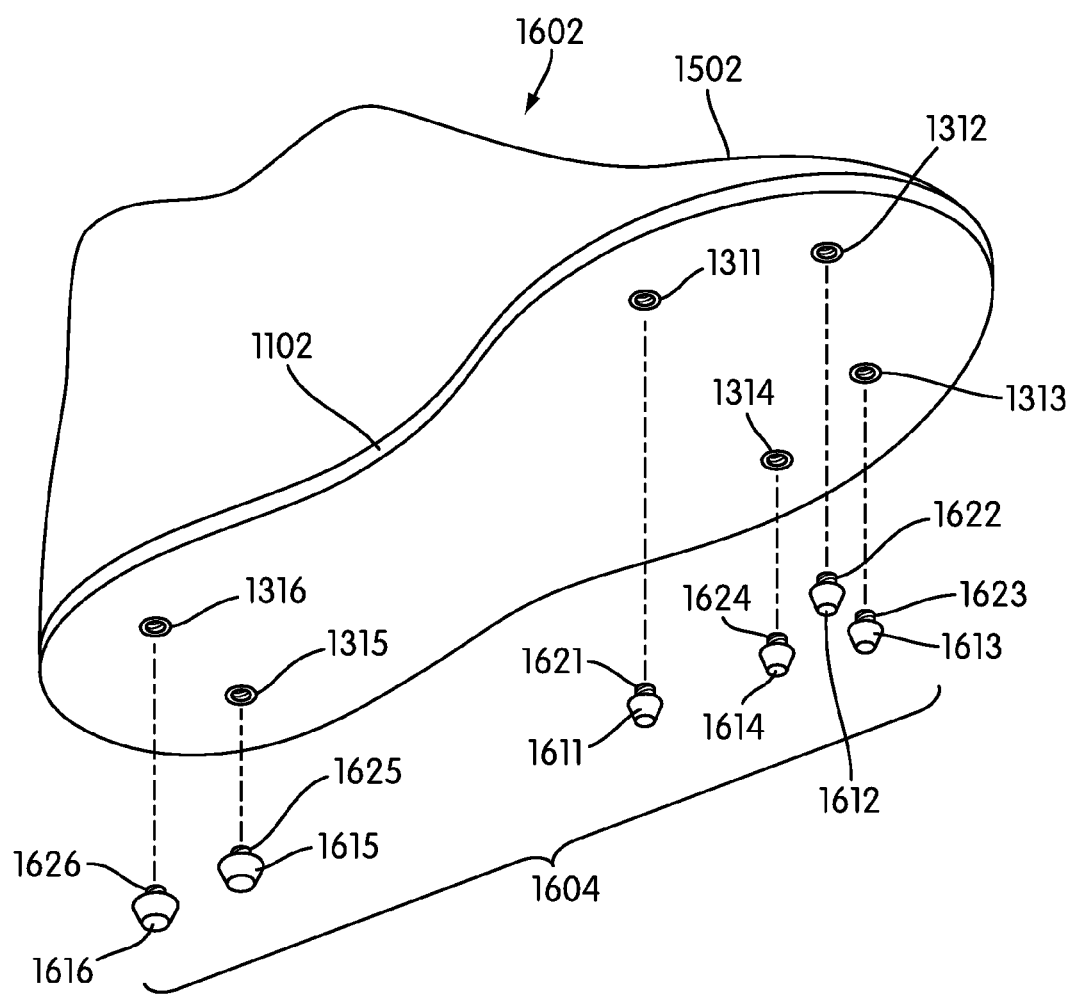
FIG. 17 is an embodiment of an assembled article of footwear including an outer plate associated with a set of cleats.

During a fourth step, shown in FIG. 17, assembled footwear 1602 may be associated with cleat set 1604. In some embodiments, cleat set 1604 includes first cleat 1611, second cleat 1612, third cleat 1613, fourth cleat 1614, fifth cleat 1615 and sixth cleat 1616 each of which are associated with first receiving member 1311, second receiving member 1312, third receiving member 1313, fourth receiving member 1314, fifth receiving member 1315 and sixth receiving member 1316. In some embodiments, cleats 1611-1616 each include a threaded portion configured to insert into receiving members 1311-1316. In this embodiment, first cleat 1611, second cleat 1612, third cleat 1613, fourth cleat 1614, fifth cleat 1615 and sixth cleat 1616 may be associated with first threaded portion 1621, second threaded portion 1622, third threaded portion 1623, fourth threaded portion 1624, fifth threaded portion 1625 and sixth threaded portion 1626, respectively. Threaded portions 1621-1626 may be screw-like with threading that engages threading within receiving members 1311-1316.

Generally, each of the cleats 1611-1616 may be chosen according to the sizes of the customized cleat arrangement designed by the customer. For example, in this embodiment, cleats 1611-1614 may be a medium sized cleat, as cleats 1121-1124 of customized cleat arrangement 1105 are designed as medium sized cleats (see FIG. 11). Likewise, cleats 1615-1616 may be a large sized cleat, as cleats 1125-1126 of customized cleat arrangement 1105 are designed as large sized cleats.

Figure 18:
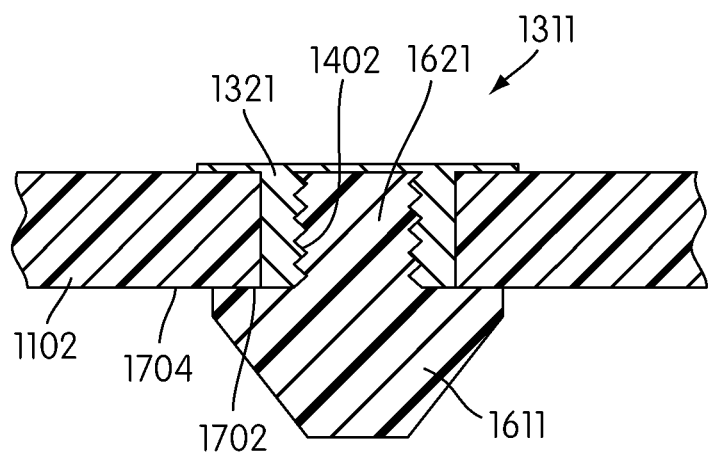
FIG. 18 is a close up cross sectional view of an embodiment of a cleat inserted into a receiving member of an outer plate.

FIG. 18 is a close up cross sectional view of an embodiment of first cleat 1611 inserted into first receiving member 1311 of outer plate 1102. In this embodiment, first threaded portion 1621 of first cleat 1611 is configured to insert into first hollow threaded core 1402 of first receiving member 1311. In some embodiments, once first cleat 1611 has been fully inserted, first side 1702 of first cleat 1611 may be disposed against lower side 1704 of outer plate 1102. With this arrangement, outer plate 1102 may be clamped between first cleat 1611 and first flange 1321. This configuration may be more stable than traditional arrangements where the receiving member of a detachable cleat is molded into an outer plate or an outsole without a flange disposed on an opposing side of the outer plate.

It should be understood that the step of associating cleats with outer plate 1102 of assembled footwear 1602 is an optional step. In some cases, cleats 1611-1616 may be inserted into receiving members 1311-1316. In other embodiments, one or more bags of cleats, including cleats 1611-1616 may be associated with assembled footwear 1602, to be attached to assembled footwear 1602 by the customer or user at a later time. In another embodiment, no cleats may be associated with assembled footwear 1602 at factory 102, and instead, cleats may be separately purchased by the user or the customer at a retail store.

Figure 19:
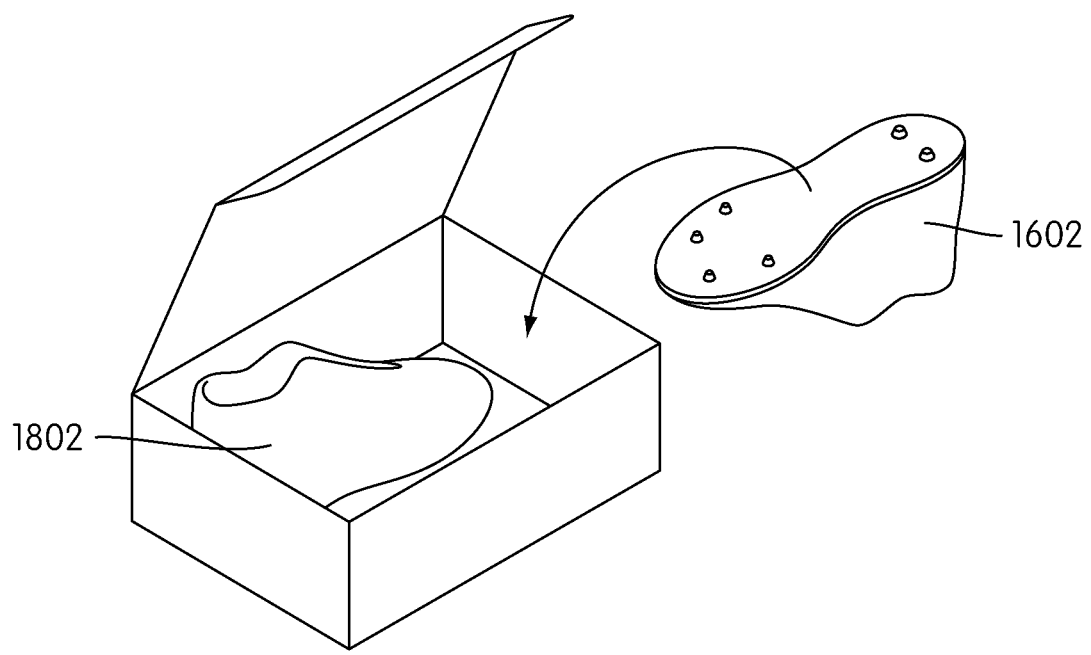
FIG. 19 is an embodiment of a pair of footwear being prepared and shipped to a pre-designated address.

During a fifth and final step, seen in FIG. 19, assembled footwear 1602 may be associated with complementary assembled footwear 1802 and shipped to a pre-designated address as supplied by the customer. In some embodiments, complementary assembled footwear 1802 has been customized according to a process similar to the process described here for customizing the cleat arrangement of assembled footwear 1602.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for ordering a customized cleat arrangement for an article of footwear, comprising the steps of:
    interacting with a graphical interface system;
    modifying an outer plate representation displayed within the graphical interface system;
    selecting a graphics tool from a set of graphics tools associated with the graphical interface system;
    defining, with the graphics tool of the graphical interface system, at least location and number of cleats to create a customized cleat arrangement;
    displaying the customized cleat arrangement including the defined location and number of cleats within the graphical interface system; and
    submitting a finalized design including an outer plate representation having the customized cleat arrangement including the defined location and number of cleats, and ordering the article of footwear.

2. The method according to claim 1, wherein the set of graphics tools includes a pointer tool.

3. The method according to claim 2, further comprising a step of selecting at least one location of a cleat using the pointer tool.

4. The method according to claim 2, wherein the set of graphics tools includes a grid line tool.

5. The method according to claim 1, further comprising a step of selecting a cleat size.

6. The method according to claim 5, wherein the step of selecting the cleat size includes selecting from a large cleat size, a medium cleat size, and a small cleat size.

7. The method according to claim 1, wherein the graphical interface system is available through a website.

8. The method according to claim 1, wherein the step of ordering the article of footwear includes ordering a pair of complementary articles of footwear having the finalized design.

9. A method for producing a customized cleat representation for an article of footwear, comprising the steps of:
    providing a graphical interface system;
    providing a set of graphics tools associated with the graphical interface system;
    receiving from the graphical interface system information related to an outer plate representation including a customized cleat arrangement, the customized cleat arrangement comprising at least location and number of cleats defined with at least one graphics tool of the graphical interface system; and
    producing an article of footwear with the customized cleat arrangement including the defined location and number of cleats based on the received outer plate representation.

10. The method according to claim 9, wherein the graphical interface system is accessible via a network.

11. The method according to claim 10, wherein the network is the Internet.

12. The method according to claim 9, wherein the step of producing the article of footwear includes a step of drilling holes into an outer plate;
    wherein the locations and number of holes in the outer plate corresponding to the locations and number of the cleats in the customized cleat arrangement.

13. The method according to claim 12, wherein the step of producing the article of footwear includes a step of inserting receiving members into the holes in the outer plate.

14. The method according to claim 13, wherein the step of producing the article of footwear includes a step of associating a set of cleats with the receiving members of the outer plate.

15. The method according to claim 14, wherein the number of cleats comprising the set of cleats is equal to the number of receiving members.

16. The method according to claim 9, wherein the step of producing the article of footwear includes producing a pair of complementary articles of footwear having the customized cleat arrangement.

17. A method of customizing cleat arrangements for a pair of complementary articles of footwear, comprising the steps of:

providing a graphical interface system for designing a customized cleat arrangement, wherein at least location and number of cleats are defined using at least one graphics tool of the graphical interface system;

receiving from the graphic interface system a design including the customized cleat arrangement comprising the defined location and number of cleats;

associating the customized cleat arrangement with a first article of footwear;

including an option within the graphical interface system for duplicating the customized cleat arrangement to be associated with a second article of footwear that is complementary to the first article of footwear; and producing a pair of complementary articles of footwear with the customized cleat arrangement.

18. The method according to claim 17, wherein the option is a button.

19. The method according to claim 17, further comprising a step of selecting a pre-designed customized cleat arrangement from a group of pre-customized cleat arrangements.

20. The method according to claim 19, further comprising a step of modifying the pre-designed customized cleat arrangement within the graphical interface system.

21. The method according to claim 17, wherein the customized cleat arrangement includes a first customized cleat arrangement associated with the first article of footwear and a second customized cleat arrangement associated with the second article of footwear; and wherein the option for duplicating the customized cleat arrangement to be associated with the second article of footwear includes generating the second customized cleat arrangement to be substantially identical to the first customized cleat arrangement.

22. A method of customizing cleat arrangements for a pair of complementary articles of footwear, comprising the steps of:

providing a graphical interface system for designing a first customized cleat arrangement and a second customized cleat arrangement, wherein at least location and number of cleats for each of the first customized cleat arrangement and the second customized cleat arrangement are defined using at least one graphics tool of the graphical interface system;

receiving from the graphical interface system a design including the first customized cleat arrangement including the defined location and number of cleats and the second customized cleat arrangement including the defined location and number of cleats;

associating the first customized cleat arrangement with a first article of footwear and the second customized cleat arrangement with a second article of footwear that is complementary to the first; and producing a pair of complementary articles of footwear with customized cleat arrangements.

23. The method according to claim 22, wherein the first customized cleat arrangement is distinct from the second customized cleat arrangement.

24. The method according to claim 22, wherein the first customized cleat arrangement is substantially identical to the second customized cleat arrangement.

25. The method according to claim 24, further comprising a step of including an option within the graphical interface system for duplicating the first customized cleat arrangement to generate the second customized cleat arrangement.

* * * * *